United States Patent [19]
Zuta

[11] Patent Number: 5,239,139
[45] Date of Patent: Aug. 24, 1993

[54] ULTRASONIC DIGITIZER PEN HAVING INTEGRATED ULTRASONIC TRANSMITTER AND RECEIVER

[76] Inventor: Marc Zuta, P.O. Box 2162, Petah Tikva, Israel

[21] Appl. No.: 798,650

[22] Filed: Nov. 26, 1991

[30] Foreign Application Priority Data

Oct. 12, 1990 [IL] Israel .................................. 096620

[51] Int. Cl.$^5$ .......................... G08C 21/00; G01F 1/66
[52] U.S. Cl. ......................................... 178/18; 367/90; 367/907
[58] Field of Search ...................... 178/18; 367/90, 94, 367/104, 105, 120, 123, 125, 907

[56] References Cited

U.S. PATENT DOCUMENTS 4,905,206  2/1990  Nishiyama et al. .................... 367/90

Primary Examiner—Stafford Schreyer

[57] ABSTRACT

An ultrasonic digitizer pen includes an ultrasonic transmitter to transmit ultrasonic waves through the air, to illuminate a writing surface. An ultrasonic receiver receives the waves reflected off the illuminated writing surface. The writing surface is a mouse pad, a wooden tabletop or other surface having a natural amount of roughness to reflect ultrasonic waves in all directions.

The transmitter and receiver are located in the pen near its tip and have radiation patterns pointing generally in the same direction, and parallel to the writing surface. At least one of the radiation patterns is narrow in a horizontal plane and wide in a vertical plane, to illuminate a narrow area of the writing surface.

phase measuring circuit measures the phase difference between the transmitted and the received ultrasonic signals. This phase is indicative of the displacement of the digitizer pen.

Two pairs of ultrasonic transmitter-receiver are used to measure a two-dimensional movement; three pairs of transmitter-receiver are used to measure movement in three dimensions.

17 Claims, 5 Drawing Sheets

The ultrasonic transmitter and receiver transducers and their mounting on the pointing pen's tip.

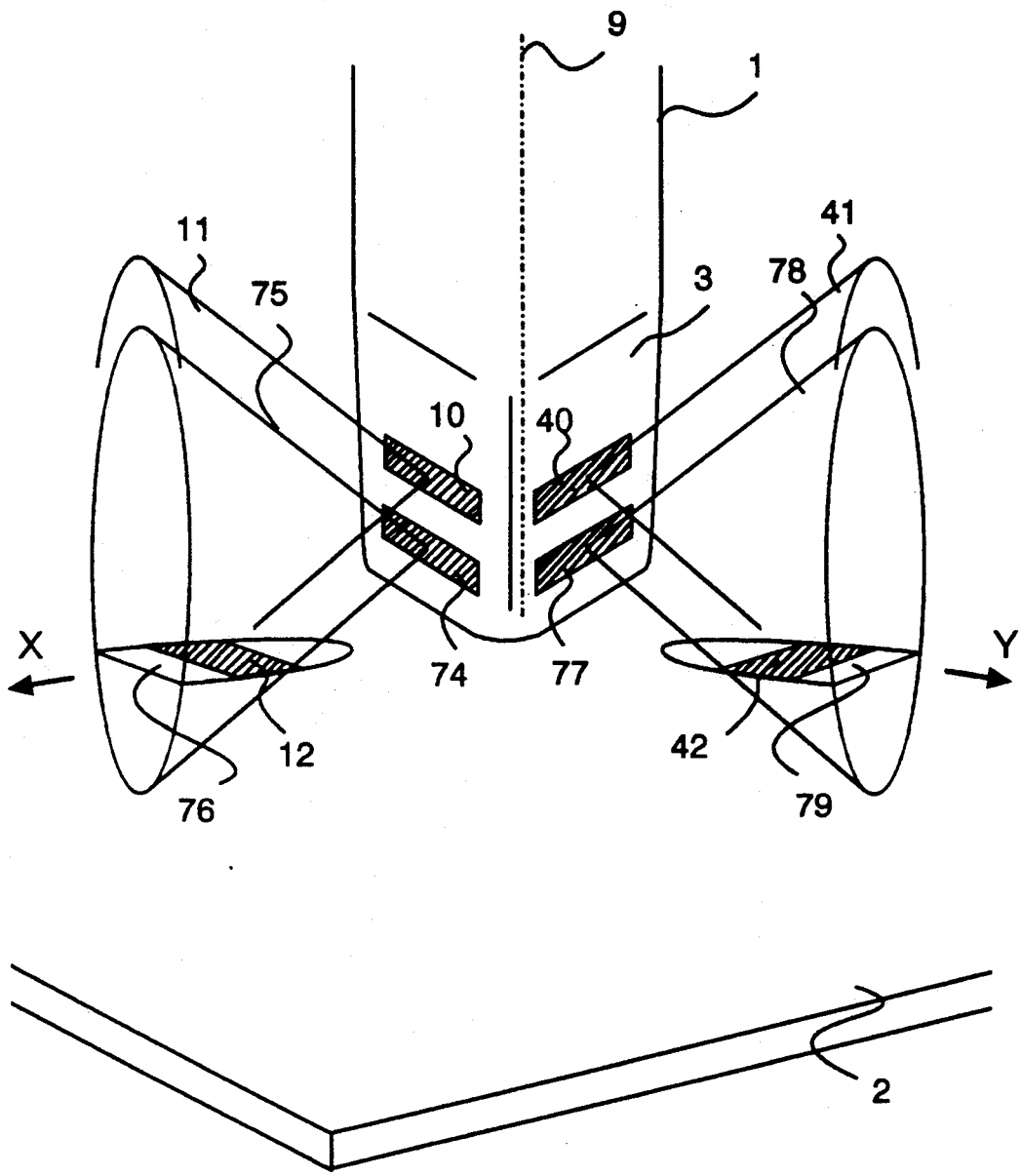
Fig. 1 - The ultrasonic transmitter and receiver transducers and their mounting on the pointing pen's tip.

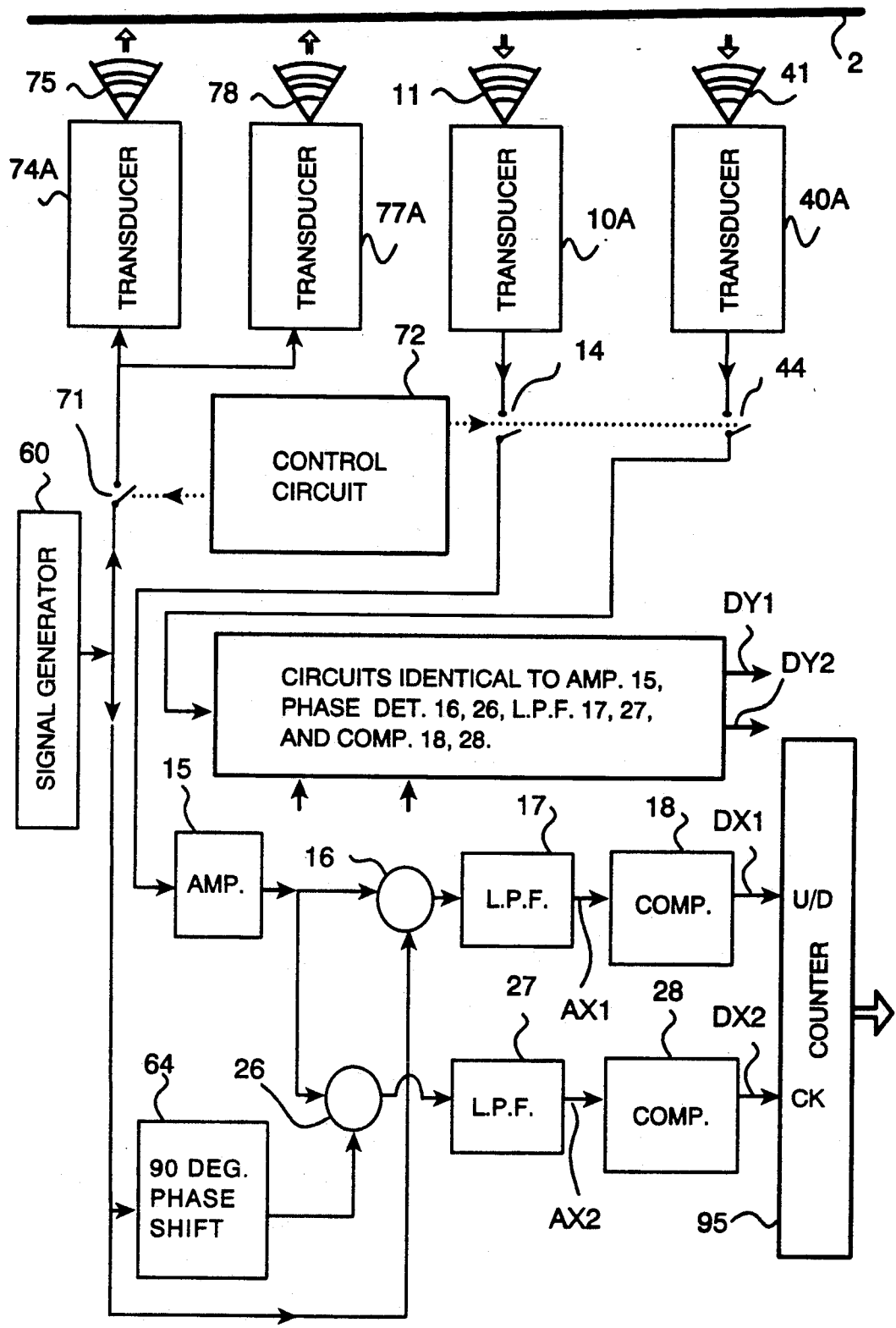
FIG. 2 - The electrical structure of the measuring system.

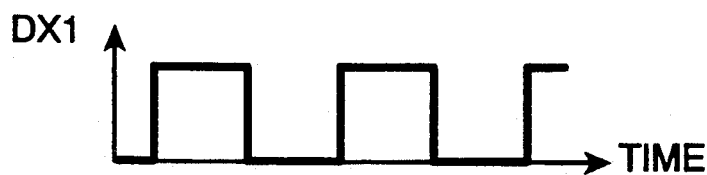
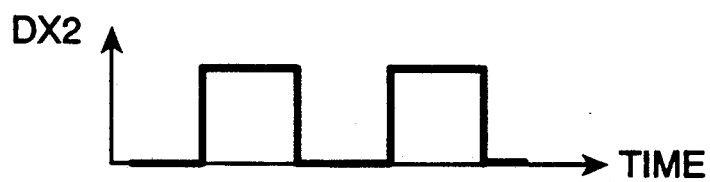
Fig. 3 - The digital signals generated for a positive velocity.
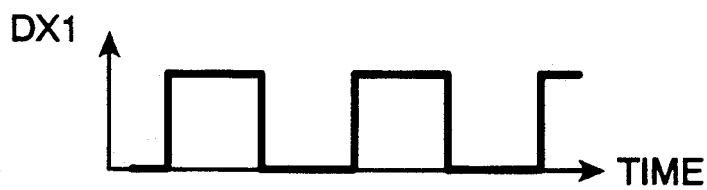
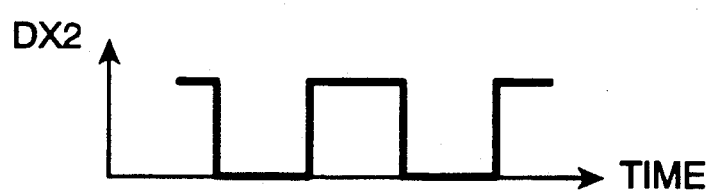
Fig. 4 - The digital signals generated for a negative velocity.

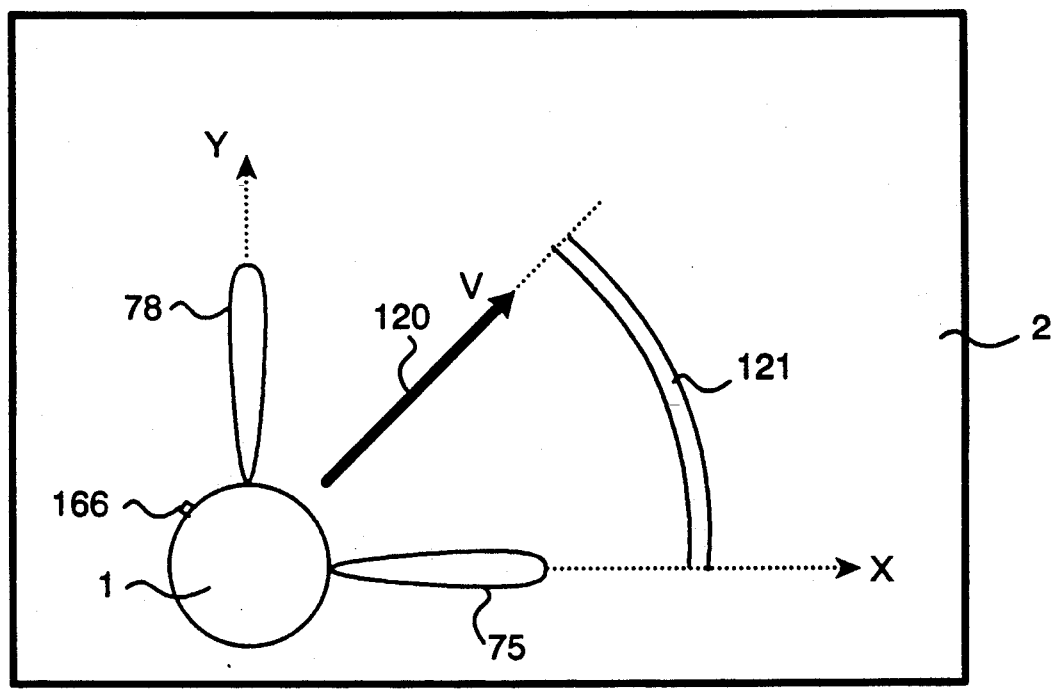
Fig. 5 - The narrow beams used to resolve the velocity and the displacement into two orthogonal components.

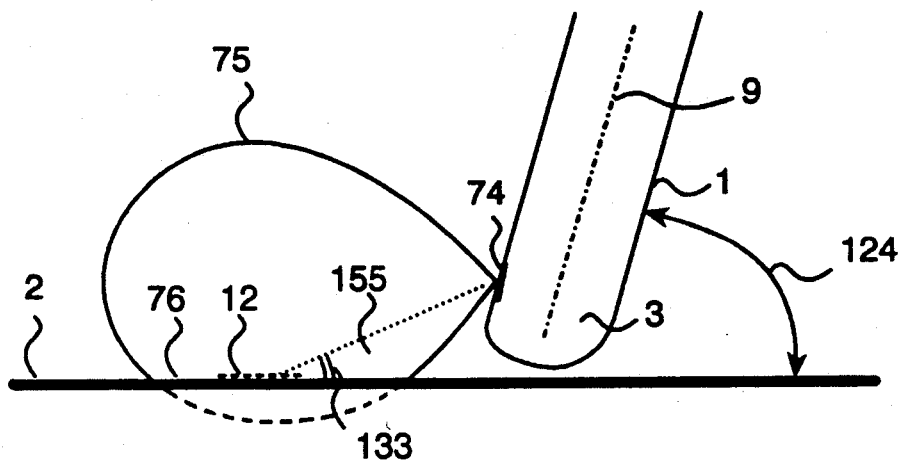
Fig. 6 - A side view of the wide beams used to illuminate the flat surface for varying angles of pen's inclination.
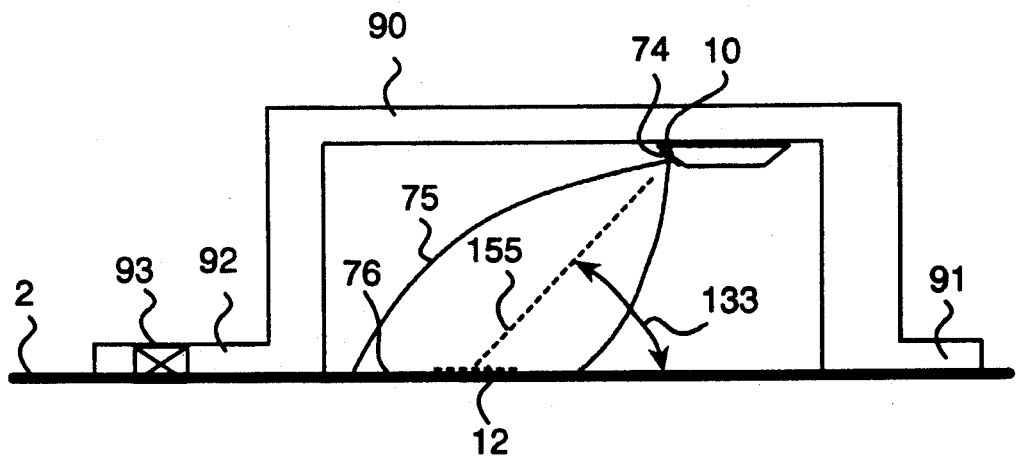
Fig. 7 - The mounting of the displacement sensing device on a supporting base sliding on the flat surface.

ULTRASONIC DIGITIZER PEN HAVING INTEGRATED ULTRASONIC TRANSMITTER AND RECEIVER

TECHNICAL FIELD

This invention relates to displacement sensing devices, and more particularly to such systems which determine the displacement of a pointing device over a planar surface by measuring the frequency and phase shift of the ultrasonic waves reflected off the planar surface, used as a graphic input device for computers.

BACKGROUND OF THE INVENTION

Heretofore, sound or ultrasonic waves were used to measure the position of a pointing device, where the pointing device transmits acoustic waves which are received by sensors in or above the edges of the writing surface. In other patents, sound waves are traveling across the writing surface, and the pointing device receives them.

However, such prior apparatus presents some implementation problems relating to disturbances in the transmission of the acoustic waves over the air or along the writing surface.

Moreover, there is a need to establish continuous, good physical contact between the pointing device and the writing surface.

Transmitting or receiving means are required on the writing surface, thereby limiting its size.

Another device, the mouse using a trackball, has lower precision because of the ball slipping on the surface, and is more difficult to use than a pen, because it demands wrist movements.

SUMMARY OF THE INVENTION

The present invention provides an apparatus for measuring the movements of a pointing and sensing device over a planar surface where ultrasonic waves are both transmitted from the device and received in the device, thus any flat surface having a measure of roughness may be used.

The displacement sensing device may be installed in the tip of a pen shaped pointing device. This results in a very easy to use embodiment, because people are used to write with pens.

The device is a computer peripheral, intended to provide signals indicative of displacement to a computer.

A transducer generates ultrasonic waves, which are transmitted in a direction generally parallel with the surface, to measure a displacement in that direction. The ultrasonic waves illuminate the writing surface and because of the roughness of the surface are then scattered in all directions. A piece of paper or the usual tabletop or a mechanical mouse pad have the required roughness to scatter the ultrasonic waves as detailed.

Part of those scattered waves are received by a transducer on the pen's tip and are converted to electrical signals.

Because of the Doppler effect, the frequency of the received waves differ from that of the transmitted waves, the frequency shift being proportional to pen'-velocity relative to the writing surface.

The phase difference between the transmitted and the received waves is proportional to the integral of the velocity, thus giving the displacement directly in multiples of the wavelength. The phase is measured by a system using a quadrature detector based on the phasing method, further using time switching to isolate between transmitter and receiver and to measure the displacement at a predetermined range.

The ultrasonic transducers are further characterized in that a narrow radiation pattern in a horizontal plane is used, thus truly measuring the velocity's component in its direction. A wide pattern in the vertical plane allows a reliable measurement for different anglesof inclination of the pen relative to the surface.

In the presently preferred embodiment, two sets of ultrasonic transducers are used, pointing in directions normal to each other and to the pen's longitudinal axis, thus resolving pen's movements into two dimensions on the writing surface.

Further objects, advantages and other features of the present invention will become obvious to those skilled in the art upon reading the disclosure set forth hereinafter.

BRIEF DESCRIPTION OF DRAWINGS

FIG. 1 details the structure and properties of the ultrasonic transmitter and receiver transducers, and their mounting on the pointing pen tip.

FIG. 2 is a description of the electrical structure of the measuring system, including the ultrasonic transmitter and receiver and means for signal processing of the received signals.

FIG. 3 illustrates the digital signals generated to indicate a positive velocity.

FIG. 4 illustrates the digital signals generated to indicate a negative velocity.

FIG. 5 details the narrow beams used to resolve the velocity and the displacement into two orthogonal components.

FIG. 6 shows a side view of the wide beams used to illuminate the flat surface for varying angles of pen's inclination.

FIG. 7 details the mounting of the displacement sensing device on a supporting base sliding on the flat surface.

DETAILED DESCRIPTION OF THE INVENTION

A preferred embodiment of the present invention will now be described by way of example and with reference to the accompanying drawings.

In the following Description and Claims, the term "Electrical Input Device" denotes a computer peripheral, intended to provide signals indicative of the displacement of a pointing device to a computer, the displacement being made in one, two or more dimensions, relative to a flat writing surface.

Referring to FIG. 1, the pen shaped pointing device 1 moves on or above the writing surface 2. The apparatus measures pen's tip 3 movement and position relative to the writing surface 2 using motion sensing means.

The device shown comprises two orthogonal motion sensing means, one measuring in the shown X direction and the second in the Y direction.

Their structure and operation is identical, therefore only the sensor in the X directon will be described. Ultrasound waves are transmitted through transmit apperture 74. Apperture 74's width of several wavelengths and height of about one wavelength result in the narrow and tall radiation pattern 75 as shown. The reason for this shape will be detailed hereinafter.

The central axis of pattern 75 defines a transmit path in a direction generally parallel to surface 2 and normal to the pen's longitudinal axis 9. The transmit aperture 74 is located near surface 2 and close to it, without physical contact.

Ultrasonic waves illuminate a narrow sector 76 of surface 2.

The natural small amount of roughness found in the surface 2 results in the scattering of the ultrasonic waves in all directions. The required amount of roughness is about several percents of the wavelength, or more.

Because of the high frequency of the ultrasonic waves, the wavelength is very small, usually less than 1/32". Therefore, a piece of paper or the usual wooden tabletop or a mechanical mouse pad have the required roughness to scatter the ultrasonic waves as detailed.

Nothing is embedded in the surface; nothing is placed at the periphery of the surface.

A receiving apperture 10 having a radiation pattern 11 similar to pattern 75 is used for receiving ultrasonic waves in a receive path generally parallel to the transmit path, thus receiving waves reflected off illuminated surface 76.

The reflected ultrasonic waves are received after a time delay. This is the time required for the waves to propagate from the transmit aperture 74 to the illuminated area 76 and back to the receive aperture 10. The time is the distance travelled, divided by the velocity of sound in air.

The illuminated area 76 can be seen as composed of many small patches like patch 12; the patches are similar, except for their location—each small patch is located at a different distance (range) from the apertures 74 and 10; therefore the ultrasonic waves reflected off each patch are received after a different time delay. Only signals received after a specific time delay are allowed to enter to the displacement measuring circuits; this time delay defines the patch 12, which is a patch on area 76 which is located at a distance from the transmit and receive apertures 74 and 10, corresponding to that time delay. The system measures the displacement using the waves reflected off this patch 12.

The implementation of the abovedetailed method is seen in FIG. 2: switch 71 is closed to connect to transducer 74A to the generator 60, to allow an ultrasonic pulse to be transmitted; after a time delay, switch 14 is closed, to allow the signal received by transducer 10A to pass to the displacement measuring circuits 15, 16, 26 etc. This time delay is known in the art as "range gate".

The time delay between the operation of switches 71 and 14 is generated by the control circuit 72. This time delay equals the time required for the ultrasonic waves to propagate from transmit aperture 74 (FIG. 1) to patch 12 and back to aperture 10. As the pen is moved across the writting surface or rotated, the patch 12 moves accordingly.

For best performance the appertures 10, 74 have to be as close as possible to each other and close to the surface 2.

Or, one common apperture (not shown) may be used for generating both the transmit radiation pattern 75 and the receive radiation pattern 11, this representing a similar embodiment of the same invention.

The importance of the narrow pattern in a horizontal plane is detailed in FIG. 5, which is a top view of pen 1 on surface 2.

Supposing a velocity vector 120, at an angle 121 to pattern 75, then the velocity measured is its component in the direction of pattern 75, thus being proportional to the cosine of angle 121.

A wide pattern will include sectors at different angles, thus measuring different velocities.

A narrow pattern results in a narrow range of velocities measured, thus truly measuring the velocity 120's component in the direction of pattern 75. The normal pattern 78 measures the component of velocity 120 in a direction normal to that of pattern 75.

The same result is achieved with either a narrow transmit pattern or a narrow receive pattern.

A preferred embodiment uses one transducer (not shown) both for trasmitting and receiving, replacing both transducers 10A, 74A, the transducer having the radiation pattern as described. The benefits are a system pattern narrower than the one way pattern, and an excellent alignment between transmit and receive patterns.

The importance of the wide pattern in the vertical plane is detailed in FIG. 6, which is a side view of pen 1 on surface 2. For different angles of inclination 124 of pen 1 relative to surface 2, there will be a part of the pattern 75 which will illuminate an area 76, thus enabling the measurement even when the pen deviates from vertical or from its designated angle. This is important because different people will hold the pen at different angles. Actually the system mounted on pen 1's tip measures not the horizontal velocity, but its component in the direction of the transmit-receive path 155, path defined by the line connecting a point between transmit 74 and receive 10 apertures with the measured path 12 of the illuminated sector 76.

This velocity component is proportional to the cosine of angle 133 between path 155 and the surface 2. Therefore, different angles of inclination 124 of pen 1 will result in a different measurement, for the same velocity.

This measurement error can be made negligibly small by keeping small the angle 133, by using a range to patch 12 which is longer than the height of appertures 10, 74.

FIG. 2 describes the electrical structure of an embodiment of the invention, using a quadrature detector to measure the velocity and displacement, using the phasing method.

Only measurement in one dimension is detailed, the second dimension using identical circuits. An ultrasonic frequency signal generator 60 is connected to the transducer 74A to transmit ultrasonic waves with pattern 75.

The waves reflected off the writing surface 2 are converted by the transducer 10A to electrical signals, which are transferred through switch 14 to the phase detectors 16 and 26, where the quadrature detection takes place.

Time switching is used to isolate between transmitter 74A and receiver 10A and to receive only from a designated range. The receiver is turned on only after the termination of the transmitted pulse. Control circuit 72 generates a first pulse train which controls the switch 71, thus switching on and off the AC signal to transducer 74A, which transmits an interrupted CW ultrasonic wave.

The switching frequency is twice or more times the maximum expected Doppler frequency, so as not to interfere with the measuring process, because of Nyquist's limit.

Control circuit 72 also generates a second pulse train, delayed relative to the first pulse train, which controls switch 14, thus switching on the received signal only for a short period, at a fixed delay from the transmitted pulse, thus generating the range-gated received signal. This signal is amplified as needed in the amplifier 15.

The phase of this signal is measured using the quadrature phase detector comprising mixers 16 and 26, and using first and second reference signals. The first reference signal is the output of generator 60, and it is connected to mixer 16; the second reference signal is the output of generator 60, after being delayed a 90 degrees phase shift in unit 64, to deliver a phase-shifted reference to the second phase detector 26.

The resulting signals at mixers' 16 and 26 outputs, contain the needed result, but also unwanted signals at the switching frequency, sum frequency and various harmonics.

Low Pass Filters 17 and 27 have a band pass range to include the maximum expected Doppler frequency, but to exclude (to stop) the unwanted signals at the switching frequency, harmonics etc.

The resulting two phase difference signals AX1 and AX2 give unambiguously the displacement in the direction of the transmit and receive paths because of the Doppler effect. A constant movement of the sensor results in an ever increasing phase, possibly many times 360 degrees. To correctly measure the displacement, the correct phase must be measured, taking into account the phase overflow every 360 degrees.

Comparators 18 and 28, having a fixed threshold preferrably of zero volts, convert the two phase differences AX1 and AX2 into digital signals-negative phase results in one digital level, and positive phase results in the other digital level.

FIG. 3 illustrates the resulting digital signals DX1 and DX2 generated to indicate a positive velocity. Each period represents a half wavelength displacement, where the wavelength is that of the transmitted ultrasound waves. DX2 rising while DX1 is High represents a positive velocity.

FIG. 4 illustrates the digital signals generated to indicate a negative velocity. DX2 rising while DX1 is Low represents a negative velocity.

Back to FIG. 2, a simple method to compute the total displacement is shown, using the Up/Down Counter 95. Signal DX2 is connected to the Clock input, thus the counter 95 counts the displacement in units of half wavelengths; and signal DX1 is connected to the Up/Down input, causing the count to increase or decrease according to velocity's sign.

This implementation takes the phase overflow every 360 degrees into account, actually counting the 360 degrees phase shifts.

Using this method, the measurement's resolution is limited to about one quarter wavelength; when using a low frequency, this may be insufficient. In this case, a more precise phase measurement may be made, using Analog to Digital Converters (not shown) for converting the two phase differences AX1 and AX2 into digital words, thus achieving a precise phase measurement, this resulting in a high resolution measurement even at low transmitted frequencies.

The phase is then computed digitally, taking into account the phase overflow every 360 degrees—after passing 360 degrees, 360 must be added to the instantaneous phase measured; after passing several times 360 degrees, that multiple of 360 has to be added. An identical method is used for negative phase, the negative direction resulting in the interpretation of the instantaneous phase as a negative value, and adding multiples of (−360) degrees as needed.

FIG. 6 detailed the measurement error because of the varying angle 133, resulting from different angles of inclination 124 of pen 1.

FIG. 7 details a precision measuring system in which this measurement error is corrected completely.

The motion sensor, including the transmit 74 and receive 10 apertures, is mounted on a pointing device 90 movable over the writing surface 2 and sliding on it—the supports 91, 92 are in contact with surface 2 at all times.

This results in the motion sensing means being suspended above surface 2 at a fixed height and keeping fixed angles 133 to the surface 2.

Therefore the velocity measured can be corrected by dividing by the known, fixed value of the cosine of angle 133, to compute the true horizontal velocity. Here the transmit pattern 75 may be directed towards area 12, and a narrower beam may be used, because of the known angle 133.

The same considerations apply to the receive pattern.

Support means 92 may include pointing means 93, for example crosshairs on a transparent surface.

The sensitivity and selectivity of the system detailed in FIG. 2 may be improved by using Intermediate Frequency amplification (not shown).

The received signal or the range-gated received signal is then mixed with a Local Oscillator to generate an IF signal. This signal may be amplified and filtered, then the phase of this signal is measured using the quadrature phase detector comprising mixers 16 and 26, and using first and second reference signals. The reference signals consist of two signals at the IF frequency, with a 90 degrees phase shift between them.

The phase of the received signal (FIG. 2) may be measured using a digital implementation of the quadrature phase detector (not shown), comprising logic gates instead of the mixers 16 and 26, and using digital first and second reference signals. A comparator can be used to convert the received analog signal to a digital signal. If the received frequency is too high or if intermediate frequency amplification is needed, then a signal derived from the received signal by frequency translation will be converted to a digital signal.

More than one range gate (not shown) may be used for the same received signal, all the gates using the same received signal.

Each gate defines a different angle 133 (FIG. 6). This method of using several channels, each channel receiving the same signal but switching on the signal at a different fixed delay from the transmitted pulse, enables measuring the velocity at several ranges, thus enabling to compute the angle of inclination of 124 of pen 1 and the height of pen's tip 3 over the surface 2.

An additional motion sensor (not shown) may be included in the pen tip 3, the sensor mounted to point downwards, in a direction which is generally normal to surface 2, thus measuring sensor's height above the surface 2. This enables a tri-dimensional measurement of the pen tip 3 displacement.

Referring to FIG. 5, a measurement error occurs when the pen 1 is rotated, this resulting in the axes X, Y pointing in directions which change relative to surface 2.

Means 166 can be included to indicate a fixed rotational angle. This will assist the user to hold the pen 1 at a fixed angle, to avoid rotating the pen 1 around an axis normal to surface 2.

Means 166 may comprise a pointing arrow painted on pen 1 or a protruding sign or a non-circular, non-symmetrical pen shape.

It will be recognized that the foregoing is but one example of an apparatus and method within the scope of the present invention and that various modifications will occur to those skilled in the art upon reading the disclosure set forth hereinbefore.

What is claimed is:

1. An Electrical Input Device for sensing displacement over a flat surface, comprising at least one motion sensing means, wherein each said motion sensing means comprises:

means for transmitting ultrasound waves in a transmit path generally parallel to said surface, wherein said trasmitter is located above said surface, said transmitting means having a transmit aperture located near said surface and close to it, without physical contact, so that said ultrasonic waves illuminate said surface;

means for receiving ultrasonic waves in a receive path generally parallel to said transmit path, said receiving means thus receiving waves reflected off said illuminated surface and generating a received electrical signal in accordance with said received ultrasonic waves, said receiving means having a receiving aperture located near said transmit aperture or using the same aperture and transducer both as transmitting and receiving means, wherein at least one of said transmitting and receiving means has a radiation pattern which is narrow in a horizontal plane, so as to illuminate a narrow sector on said surface or receive from a narrow sector on said surface, and means for measuring the phase of said received electrical signal relative to the phase of said transmitted ultrasound waves, said phase being proportional to said measured displacement.

2. An Electrical Input Device for sensing displacement over a flat surface in accordance with claim 1, wherein said means for measuring the phase between the transmitted and received signals further includes:

means for switching on said received signal only for a short period at a fixed delay from the transmitted pulse, thus generating the range-gated received signal;

means for measuring the phase of said range-gated received signal using a quadrature detector, by mixing said signal with first and second reference signals at the frequency of said transmitted signal with a 90 degree phase shift between them.

3. An Electrical Input Device for sensing displacement over a flat surface in accordance with claim 1, wherein there are two motion sensing means, and wherein the transmit and receive paths of one of said motion sensing means point in a direction which is normal to the direction of the transmit and receive paths of the second said motion sensing means.

4. An Electrical Input Device for sensing displacement over a flat surface in accordance with claim 1, wherein said motion sensing means are mounted on the tip of a pen shaped pointing device movable over a writing surface, and the tip of said pointing device designates the position to be sensed.

5. An Electrical Input Device for sensing displacement over a flat surface in accordance with claim 3, wherein said motion sensing means are mounted on the tip of a pen shaped pointing device movable over a writing surface, and the tip of said pointing device designates the position to be sensed.

6. An Electrical Input Device for sensing displacement over a flat surface in accordance with claim 1, wherein said means for transmitting or for receiving ultrasonic waves has a path which is parallel to or oblique towards said transmit path, and wherein said motion sensing means is mounted on a pointing device movable over a writing surface and sliding on it, resulting in said motion sensing means being suspended above said surface at a fixed height and keeping fixed angles to said surface.

7. An Electrical Input Device for sensing displacement over a flat surface in accordance with claim 6, wherein there are two motion sensing means, and the transmit and receive paths of one of said motion sensing means point in direction which is normal to the direction of the transmit and receive paths of the second said motion sensing means.

8. An Electrical Input Device for sensing displacement over a flat surface in accordance with claim 1, wherein said means for measuring the phase of said received electrical signal further includes threshold means for converting said two phase differences into digital signals, wherein negative phase results in one digital level, and positive phase results in the other digital level.

9. An Electrical Input Device for sensing displacement over a flat surface in accordance with claim 1, wherein said means for measuring the phase of said received electrical signal further includes means for converting said two phase differences into digital words using analog to digital converters, thus resulting in a precise phase measurement at any given time.

10. An Electrical Input Device for sensing displacement over a flat surface in accordance with claim 1, wherein said means for measuring the phase of said received electrical signal further includes one or more additional channels, each said channel receiving the same signal but switching on said signal at a different fixed delay from the transmitted pulse, thus measuring the velocity at several ranges.

11. An Electrical Input Device for sensing displacement over a flat surface in accordance with claim 1, further including motion sensing means mounted to point downwards in a direction which is generally normal to said surface, thus measuring said sensor's height above said surface.

12. An Electrical Input Device for sensing displacement over a flat surface in accordance with claim 1, further including means to indicate a fixed rotational angle, to assist the user to avoid rotating said input device around an axis normal to said surface.

13. An Electrical Input Device for sensing displacement over a flat surface in accordance with claim 1, wherein said means for measuring the phase of said received electrical signal further includes means for converting said received signal to an Intermediate Frequency, means for amplifying the resulting signal and means for measuring its phase using a quadrature phase detector using a pair of reference signals at the same Intermediate Frequency, with a 90 degrees phase shift between therebetween.

14. An Electrical Input Device for sensing displacement over a flat surface in accordance with claim 2, wherein said motion sensing means are mounted on the tip of a pen shaped pointing device movable over a writing surface, and the tip of said pointing device designates the position to be sensed.

15. An Electrical Input Device for sensing displacement over a flat surface in accordance with claim 2, wherein said means for transmitting or for receiving ultrasonic waves has a path which is parallel to or oblique towards said transmit path, and wherein said motion sensing means is mounted on a pointing device movable over a writing surface and sliding on it, resulting in said motion sensing means being suspended above said surface at a fixed height and keeping fixed angles to said surface.

16. An Electrical Input Device for sensing displacement over a flat surface in accordance with claim 1, wherein said means for measuring the phase of said received electrical signal further includes threshold means for converting said received electrical signal or a signal derived from said signal to a digital signal, and digital means to measure the phase difference using a digital replica of the reference signals.

17. A method for measuring the movement of a sensing device over a writing surface comprising the steps of:

transmitting ultrasound waves in at least one transmit path generally parallel to said writing surface;

receiving ultrasonic waves in at least one receive path, each said receive path being generally in the direction of one of said transmit path, and measuring the phase of said received signal or of a signal derived therefrom relative to first and second reference signals, wherein said first reference signal is an electrical signal at the frequency of said transmitted signal or at a frequency generated therefrom, and said second reference signal has the same frequency as said first signal and is shifted 90 degrees relative to said first signal, further including filtering to stop the switching frequency and higher frequencies, the resulting two phase differences giving unambiguously the displacement in the direction of said transmit and receive paths.

* * * * *